Aug. 20, 1935.   P. S. MARTIN   2,011,684
COMBINATION FEED TROUGH AND DRINKING FOUNTAIN
Filed Aug. 18, 1930
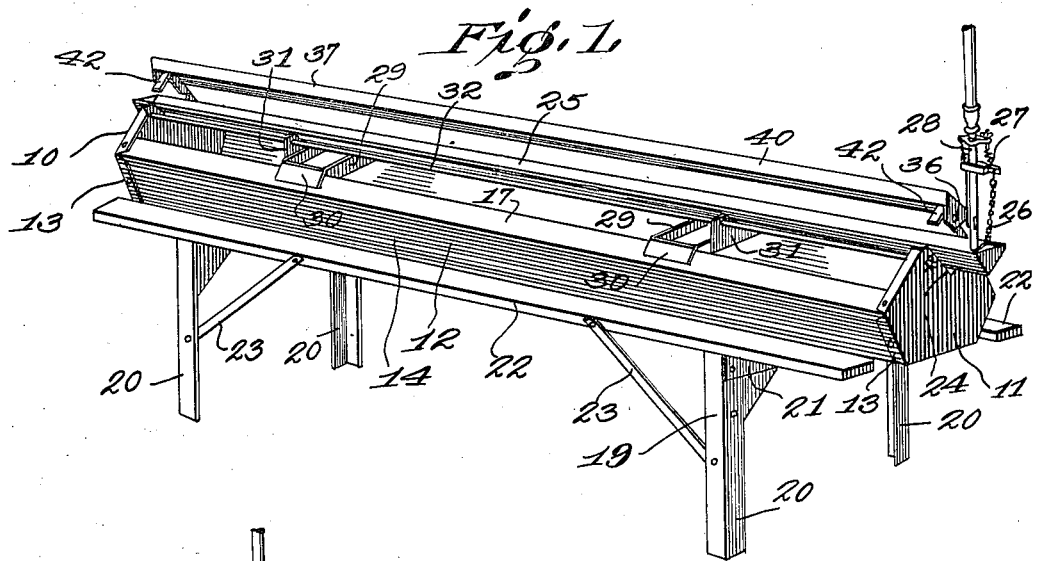
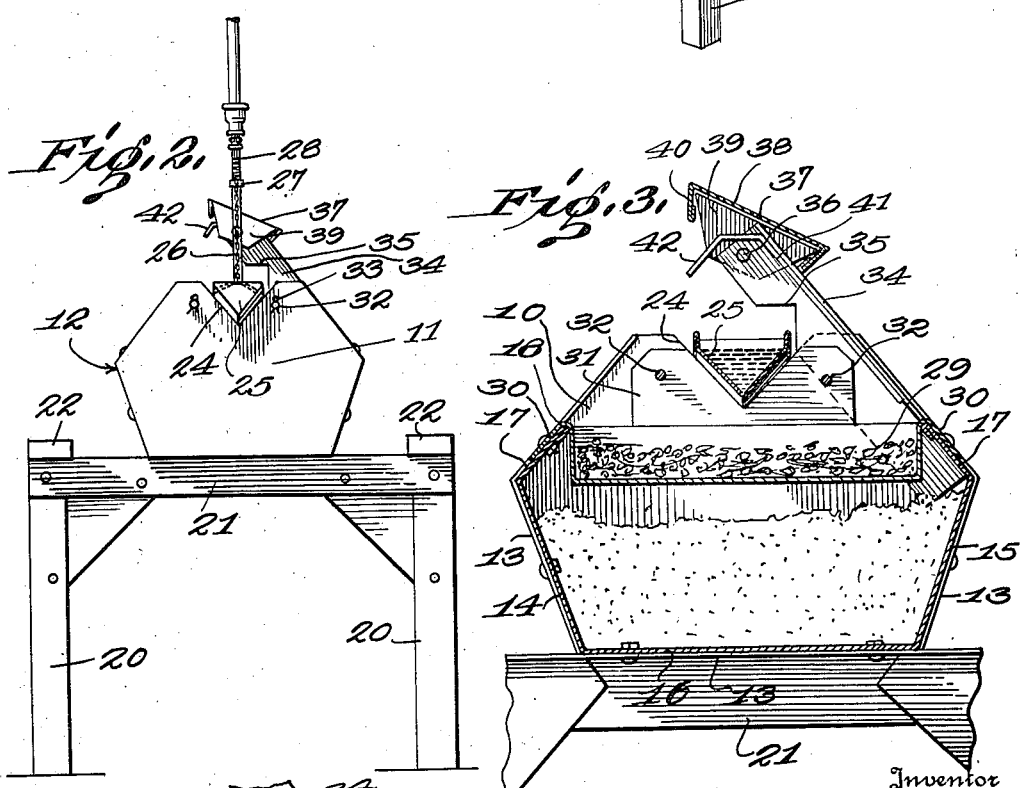
Inventor
Perry S. Martin Patented Aug. 20, 1935

2,011,684

UNITED STATES PATENT OFFICE 2,011,684

COMBINATION FEED TROUGH AND DRINKING FOUNTAIN

Perry S. Martin, Harrisonburg, Va.

Application August 18, 1930, Serial No. 476,089

13 Claims. (Cl. 119—61)

This invention relates to a combination feed trough and drinking fountain for fowls, having the drinking fountain superimposed above the upper open or accessible portion of the feed trough which contains a mash feed, thereby causing fowls to consume more mash feed than they ordinarily would, due to the fact that they may remain at the device and drink while feeding.

Another object of the invention is the provision of a supporting structure which elevates the feed trough and drinking fountain above the ground, said supporting structure also having elevated perches thereon for fowls to stand upon while feeding and drinking, thus providing more floor space and overcoming the undesirable feature of litter being scratched into the trough.

A further object of the invention is to provide a combination feed trough and drinking fountain having a pivotally mounted cover member superimposed a sufficient distance above the drinking fountain to prevent fowls perching on the same and whereby the cover member will swing to either side upon the weight of a fowl thereon, thereby preventing perching on the cover member, as well as providing means for vibrating the device when swung to the limit of its movement in either direction for shaking feed down from the side walls of the trough.

A still further object of the invention is the provision of a plurality of receptacles extending across the feed trough, below the water trough, and carried by the side walls of the feed trough for containing shells and grit which may be consumed by the fowls while feeding and drinking.

Still another object of the invention is to provide a pair of longitudinally extending rods arranged at opposite sides of the water trough between the same and the side walls of the feed trough, whereby the fowls are prevented from entering the feed trough or perching on the side edges of the trough, said rods also form guards for preventing fowls striking the water trough and splashing water into the feed trough.

A still further and more specific object of the invention is the provision of a removable water trough adapted to normally lie in notches formed in the opposite end members of the feed trough with one end of the water trough supported by one end member, while the opposite end thereof is suspended by a flexible connection to an automatic water supply valve, the weight of said water trough controlling the flow of water from the valve to the same.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

In the drawing:

Figure 1 is a perspective view of my improved device.

Figure 2 is an end view of the same.

Figure 3 is a fragmentary enlarged vertical section.

Figure 4 is a fragmentary end view of a slightly modified form.

In carrying out the invention, the numerals 10 and 11 designate end members of a trough 12, said end members having inwardly extending flanges 13, which lie on and are secured to the outer surfaces of the side walls and bottom wall of the trough. The side walls 14 and 15 of the trough diverge from each other as they extend upwardly from the bottom 16 throughout the major portion thereof and then converge towards one another, as indicated by the number 17. The upper edges of the side walls 14 and 15 are turned under, as at 18, so as to provide smooth surfaces.

In order that the trough 12 may be elevated from the ground I have provided a supporting structure 19, which comprises a pair of legs 20 at each end, each pair being connected together at their upper ends by means of cross members 21 upon which the trough 12 rests. The two pairs of legs 20 are connected together by means of oppositely arranged perch bars 22, one being arranged on each side of the trough 12. Braces 23 extend from the legs 20 to the perch bars 22 for reenforcing the supporting structure.

The end members 10 and 11 extend above the side walls of the trough and are notched centrally thereof, as at 24, to provide substantially V-shaped recesses through which the opposite ends of water trough 25 extend.

As the water trough is substantially V-shaped in cross section, it can be seen that the V-shaped recesses will support the water trough against turning movement. One end of the water trough 25 rests in one of the V-shaped recesses 24, while the opposite end thereof is suspended from engagement with the recess adjacent thereto by means of a chain or the like 26 having its lower end connected to the water trough 25 while its upper end is connected to an operating lever 27 of an automatic water supply valve 28. As shown in Figure 1, it can be seen that the discharge nozzle of the valve 28 is positioned directly above the water trough 25, in order that water from the valve will be received by the trough.

Extending across the feed trough 12 is a pair of receptacles 29 which are substantially rectangular in shape and carry at their opposite ends depending flanges 30, which engage over the angled portions 17 of the side walls 30 of the trough for supporting the receptacles. Sand is placed in one of the receptacles 29, while grit is placed in the other.

The side walls of the receptacles 29 adjacent the end members 10 and 11 carry upstanding plates 31, which are also provided with V-shaped notches, which aline with the notches 24 in the end members 10 and 11, in order that the same will aid in supporting the water trough in proper position.

Arranged at opposite sides of the water trough 25 between the same and the side walls 14 and 15 of the trough are longitudinally extending rods 32, which extend through openings in the end members 10 and 11 and openings in the upstanding plates 31 of the receptacles 29. The rods 32 are prevented against sliding movement, by means of cotter pins or the like 33 passed thru the rods on the outer sides of the end members 10 and 11.

Each of the end members 10 and 11 supports an angle member 34, which extends from the side wall 15 of the trough to a point directly above the feed trough and water trough. The angle members 34 are notched, as at 35, adjacent the water trough so as not to interfere with removal of the water trough from the feed trough. The upper ends of the angle members 34 pivotally support, as at 36, the opposite ends of a cover member 37. Said cover member is constructed with a top wall 38, the end walls 39 which carry the pivotal connections and side walls 40 that converge slightly towards each other as they extend downwardly. Carried by each of the angle members 34 are bars 41 which extend over the points of pivotal connection of the cover member to the opposite side of said point of pivotal connection, as at 42, for providing stops for limiting swinging movement of the cover member in one direction, while the angle members 34 limit swinging movement of the cover member in the opposite direction. In Figure 4, of the drawing, I have shown one of the receptacles for containing shells or grit arranged externally of the feed trough. When arranging receptacles in this manner, the rods 32 extend through the openings in the plates 31 and the cotter pins 33 on the rods are arranged outwardly of the plates 31. By arranging receptacles 29 in this manner it can be seen the danger of water being splashed therein while fowls are feeding and drinking is eliminated to a great extent.

When the device is in use, mash feed is placed in the feed trough 12, shells and grit in the receptacles 29, while water flows to the water trough 25 from the automatic supply valve 28. Fowls desiring to feed and drink perch on the perch bars 22 at opposite sides of the trough 12 and have access to mash feed, shells, grit and water while still perched upon the bars 22. By having the rods 32 positioned as shown in the drawing, the same will prevent fowls getting into the feed trough or perching on the upper edges of the side walls 14 and 15, said rods being located with respect to the upper edges of the side walls that the body of a fowl would engage same should a fowl attempt to perch at such points. The rods also act as guards for preventing fowls striking the water trough and splashing considerable water therefrom into the feed trough.

It is a well known fact that the more mash fowls consume the greater the egg production will be and that when fowls are feeding on dry mash, they will consume more when drinking at frequent intervals. By having the water trough arranged so as to be accessible while feeding on the mash, it can be seen that the consumption of mash will be greatly increased. Also by having the water trough arranged directly above the mash, drops of water frequently fall into the mash and form small portions of wet mash which are very appetizing to the birds.

As one end of the water trough is supported by one end member of the trough and the opposite end member of the water trough is suspended by means of a connection to the operating lever of an automatic water supply valve, it can be seen that when the level of water in the water trough lowers, the weight of the water trough will be lessened, thus causing the free end of the water trough to be raised by the valve during opening thereof. When the water trough is again filled, the weight of the trough is increased and the operating lever of the valve is pulled down so as to cut off the flow of water to the water trough. It can be seen that the water trough may be conveniently removed, when desired, for cleaning or the like.

By having the cover member pivotally supported, fowls cannot perch on it or on the water trough, and that due to the fact that the upper edges of the side walls 14 and 15 of the trough are arranged inwardly and near the rods 32, it is not possible for fowls to perch thereon. Therefore, it is not possible for them to contaminate the feed and water with droppings.

Fowls will attempt to perch upon the cover member and will light on the highest edge thereof. It will cause the cover member to swing on its pivot due to the weight of the fowl and thus swing the cover member downwardly with considerable force. When striking the element which limits downward movement thereof, the entire device will be vibrated and will cause all feed adhering or against the side walls of the feed trough to be shaken down.

Having described my invention, what I claim is:

1. A device of the character described comprising an elongated feed trough having an upper accessible portion, transverse receptacles resting upon the feed trough, and a water trough superposed above the accessible portions to the feed trough and resting upon the receptacles, said water trough having a V-shaped bottom and said receptacles having V-shaped notches to receive said water trough bottom.

2. A device of the character described comprising a feed trough having side walls, end walls, and a bottom wall, receptacles extending across the feed trough and having the opposite ends thereof supported by the opposite side walls of the feed trough, said ends being shaped to engage the side walls in a manner to stiffen them against lateral bending, and a water trough superposed above the feed trough and receptacles.

3. A device of the character described, comprising a feed trough having side walls, end walls, and a bottom wall, receptacles, and flanges arranged on opposite ends of each of said receptacles to engage over opposite side walls of the feed trough for supporting the receptacles transversely across the feed trough.

4. A device of the character described comprising a feed trough having oppositely arranged upstanding end walls, a water trough superposed above the feed trough and having one end thereof supported by one end wall of the feed trough, water supply means supporting the opposite end of the water trough, a top member pivoted in said end walls directly above the water trough and adapted to swing to opposite sides, and means for limiting swinging movement of said top member, said member serving as a cover and shade for the water trough and feed trough.

5. A device of the character described comprising a feed trough having oppositely arranged upstanding end walls, a water trough having one end thereof supported by one of said end walls, water supply means supporting the opposite end of said water trough, angle members carried by said end walls and extending upwardly to points directly above the center of the feed trough, a top member having oppositely arranged end flanges, means pivotally connecting said flanges of said top member to the upper ends of said bars, depending side flanges on said top member one of which is adapted to engage the bars for limiting pivotal movement of the top member in one direction, and brackets carried by said angle members and extending to opposite sides of the pivotal connections adapted to be engaged by the opposite flange of the top member for limiting swinging movement in the opposite direction, said member serving as a cover and shade for the water trough and feed trough.

6. A device of the character described comprising a feed trough having an upper open portion, a water trough superposed above the feed trough, receptacles supported by the feed trough and extending across the same beneath the water trough, and means carried by said receptacles for aiding in supporting the water trough.

7. A device of the character described comprising a feed trough having an upper open portion, a water trough superposed above the feed trough, receptacles supported by the feed trough and extending across the same beneath the water trough, upstanding plates carried by the receptacles for aiding in supporting the water trough, and rods extending longitudinally of the feed trough and carried by the same and the upstanding plates on the receptacles, said rods being arranged at the accessible portions to the feed trough.

8. A device of the character described comprising a feed trough having side walls, end walls, and a bottom wall, said side walls diverging as they extend upwardly from the bottom wall throughout the major portion thereof and then converging upwardly, said end walls extending higher than said side walls and having the opposite side edges thereof above said side walls arranged in line with the converging portions of the side walls, a water trough having one end thereof supported by one end of the feed trough, a water supply valve supporting the opposite end of the water trough, receptacles, and flanges arranged at the upper edges of the end walls of the receptacles and engaging over the upper edges of the side walls of the feed trough for supporting the receptacles across the feed trough beneath the water trough and serving to hold the side walls from spreading.

9. A device of the character described comprising a feed trough having oppositely arranged side and end walls, a member pivotally carried by said end walls and being limited thereby against swinging movement to either side for vibrating said trough when swung to the limit of its movement in either direction.

10. In a device of the character described comprising a feed trough, and a movable member carried by the trough and having limited motion in opposite directions against the trough, said member being sufficiently heavy to jar said trough when moved to the limit of its movement in either direction, so as to shake the food in the trough.

11. A device of the character described comprising a feed trough, a water trough supported by the said feed trough, and arranged longitudinally therewith, and spaced receptacles carried by said feed trough and arranged transversally thereto, said receptacles being located between the two troughs whereby fowls have ready access thereto whether eating or drinking.

12. A device of the character described comprising a feed trough, a water trough carried by said feed trough, a pair of rods carried by said feed trough and extending longitudinally thereof, receptacles, and upstanding members carried by said receptacles and attached to said rods for supporting said receptacles.

13. A device of the character described comprising an elongated feed trough, a plurality of transverse feed receptacles supported on said trough, and a water trough longitudinally superposed above the feed trough and resting in part on said transverse receptacles.

PERRY S. MARTIN.